United States Patent [19] [11] 3,984,174
Landgreen [45] Oct. 5, 1976

[54] FIBER OPTIC CONNECTOR WITH TRANSPARENT CABLE SLEEVE

[75] Inventor: Eleanor A. Landgreen, Temple City, Calif.

[73] Assignee: International Telephone and Telegraph Corporation, New York, N.Y.

[22] Filed: Apr. 28, 1975

[21] Appl. No.: 572,159

[52] U.S. Cl. ............................................. 350/96 C
[51] Int. Cl.² ........................................... G02B 5/16
[58] Field of Search ........................ 350/96 C, 96 B

[56] References Cited
UNITED STATES PATENTS

| | | |
|---|---|---|
| 3,455,625 | 7/1969 | Brumley et al. ............... 350/96 C |
| 3,904,269 | 9/1975 | Lebduska et al. .............. 350/96 C |

Primary Examiner—John K. Corbin
Assistant Examiner—Stewart Levy
Attorney, Agent, or Firm—Thomas L. Peterson

[57] ABSTRACT

A fiber optic cable for use in a fiber optic connector has a transparent sleeve formed on the end of the fiber optic bundle of the cable. The end of the sleeve is closed and extends over the end surface of the bundle to form an optical window therefor and a protective spacer so that when two cables are mated in abutting relationship the end surfaces of the fiber bundles are spaced apart, preventing end surface bundle scratching which causes excessive light diffusion and results in light reception losses.

10 Claims, 4 Drawing Figures

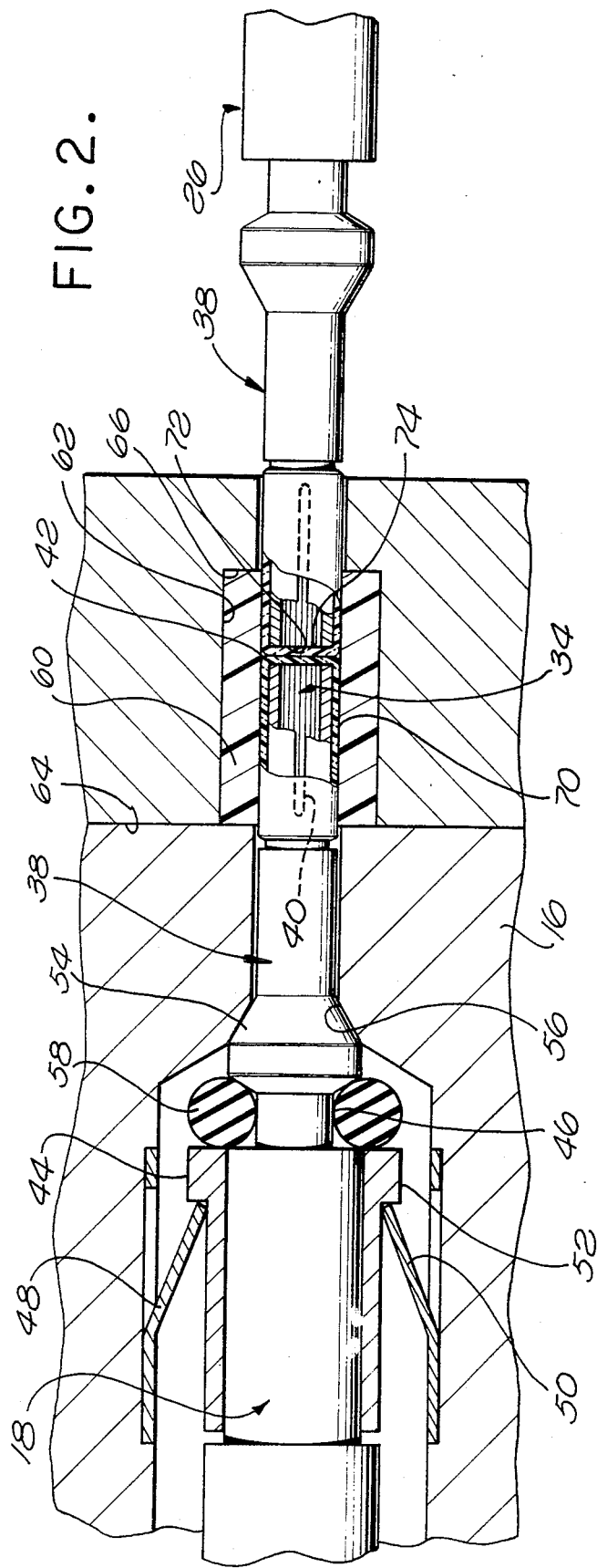
FIG. 2.
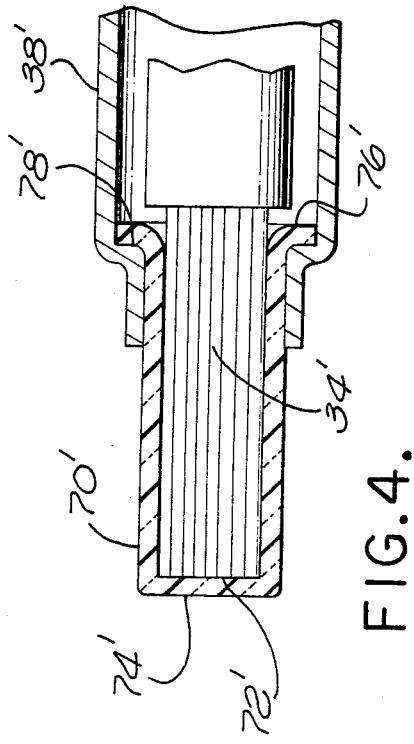
FIG. 4.
FIG. 3.

FIBER OPTIC CONNECTOR WITH TRANSPARENT CABLE SLEEVE

CROSS-REFERENCE TO RELATED APPLICATION

This application is related to copending U.S. application of Bruce K. Arnold entitled, "Fiber Optic Connector with Protective Cable Sleeves," Ser. No. 536,024, filed Dec. 23, 1974, and assigned to the same assignee as the present application.

BACKGROUND OF THE INVENTION

The present invention relates to connectors and, more specifically, to connectors for fiber optic cables.

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber cables with protective outer coatings or jackets. The jacket makes them resemble ordinary metallic-core electrical cable upon superficial external inspection. Obviously, if fiber optic cables are to be used in practical signal transmission and processing systems, practical connectors for the connection and disconnection of fiber optic cables must be provided.

Before the prior art in respect to connectors, per se, is discussed, some references will be given for background in the state of fiber optic art in general.

An article entitled, "Fiber Optics," by Narinder S. Kapany, published in *Scientific American*, Vol. 203, pgs. 72-81, November 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or offset, are among the factors effecting the light transfer efficiency at a connector. In this connection, attention is directed to the *Bell System Technical Journal*, Vol. 50, No. 10, December 1971, specifically to an article by D. L. Bisbee, entitled, "Measurement of Loss Due to Offset, and End Separations of Optical Fibers." Another *Bell System Technical Journal* article of interest appeared in Vol. 52, No. 8, Oct. 1973, and was entitled, "Effect of Misalignments on Coupling Efficiency on Single-Mode Optical Fiber Butt Joints," by J. S. Cook, W. L. Mammel and R. J. Grow.

The patent literature also contains much information relative to the state of this art. For example, U.S. Pat. No. 3,624,816 describes a "Flexible Fiber Optic Conduit." The device described therein uses a plurality of ligh conducting fibers in a flexible cable-type arrangemen*.

Concerning the utility of fiber optic cables and therefore the utility of connectors for such cables, various systems are described in the patent literature which employs fiber optic cables. One example of such a utilization system is described in U.S. Pat. No. 3,809,908, "Electro-Optical Transmission Line."

Yet another patent of interest is entitled, "Glass Fiber Optical Devices," U.S. Pat. No. 3,589,793. This reference relates to the fiber optic bundles and the glass fibers themselves as well as to a method of fabrication for the fiber optic elements themselves.

A selection of U.S. patents relating more particularly to optical cable connectors includes U.S. Pat. Nos. 3,790,791; 3,734,594; 3,637,284; 3,572,891; 3,806,225; 3,758,189 and 3,508,807. These patents are representative of the connector prior art.

A fiber bundle-to-fiber bundle connector design requires the polished bundle ends to be positioned and held in close proximity. The most direct way to accomplish this is to butt the bundle ends together. When the ends of the fiber bundles are in abutting contact, repeated matings of the connector members in which the bundles are mounted and movement due to vibration can cause bundle surface scratching, especially when grit is present in the connector. The result is excessive light diffusion, causing optical losses at the abutting bundle interface. Losses due to surface scratching may amount to 4 dB or more. The purpose of the present invention is to provide a fiber optic cable arrangement which eliminates scratching of the end surfaces of the fiber bundles with optical power losses less than that which results from surface scratching.

SUMMARY OF THE INVENTION

According to the principal aspect of the present invention, there is provided a fiber optic cable for use in a fiber optic connector wherein a transparent sleeve surrounds the end of the fiber optic bundle of the cable. The sleeve has a closed end extending over the planar end surface of the fiber bundle forming an optical window for the bundle. The sleeve has an index of refraction substantially matching that of the fibers in the bundle. When two fiber optic cables having such sleeves thereon are brought into axial abutting contact with each other in a fiber optic connector, the sleeves provide protective spacers, spacing the end surfaces of the bundles apart thereby preventing scratching of the bundle end surfaces. Thus, the present invention eliminates optical losses due to excessive light diffusion resulting from the scratching of the end surfaces of the fiber bundles. The closed ends of the sleeves are sufficiently thin so that the gap between the fiber bundle ends results in only minor losses in optical transfer between the cables. The transparent sleeve also avoids the need for a highly polished optical fiber end surface.

BRIEF DESCRIPTION OF THE DRAWINGS

FIG. 2 is a fragmentary partial longitudinal sectional view of the connector showing the details of structure of the abutting ends of the fiber optic cables employed in the connector having protective sleeves thereon;

FIG. 3 is an end view of one of the cables illustrated in FIGS. 1 and 2 with a portion of the protective sleeve removed; and FIG. 4 is a longitudinal sectional view through the end portion of a modified form of the cable of the present invention.

DESCRIPTION OF THE PREFERRED EMBODIMENTS

Figure 1:
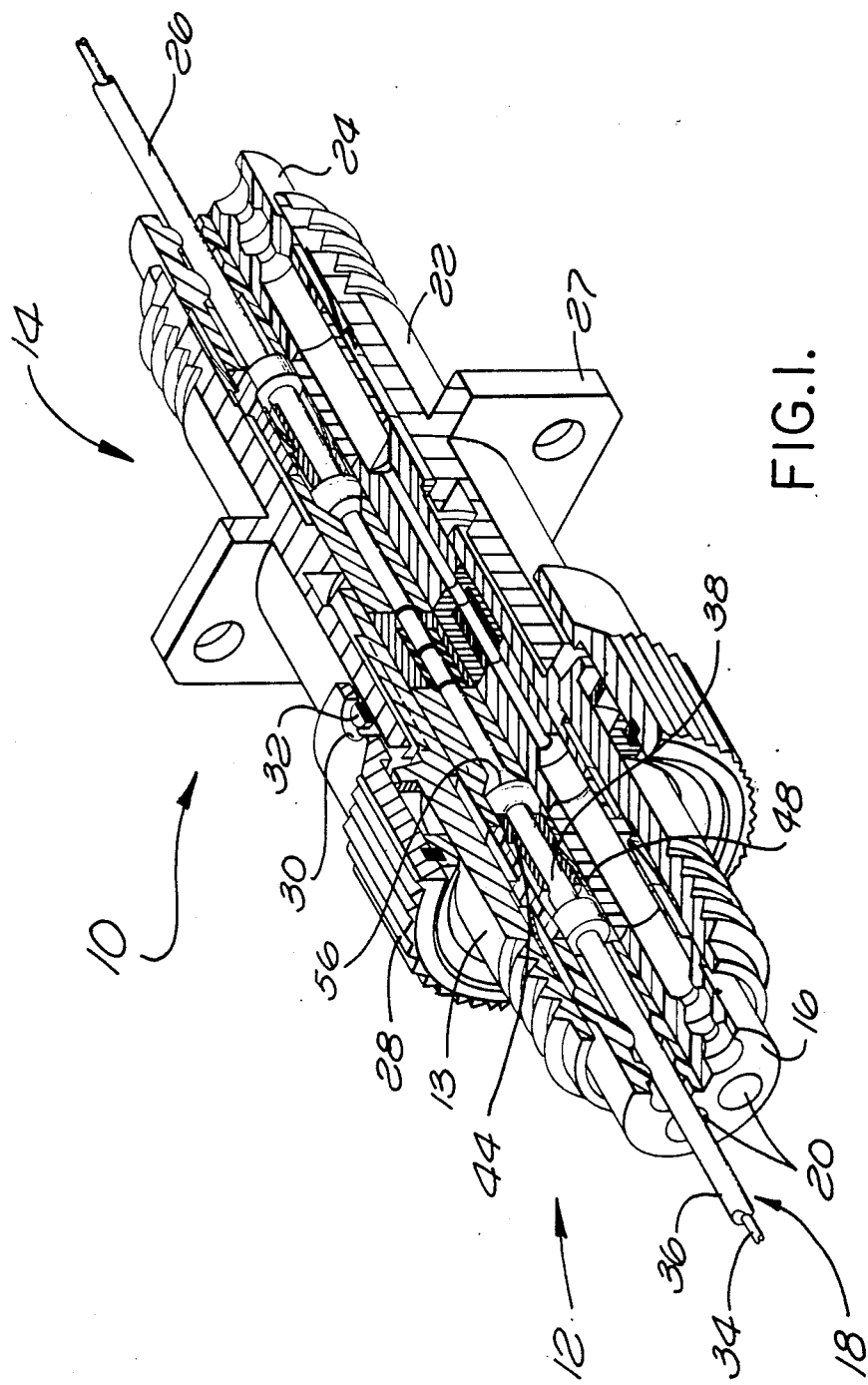
FIG. 1 is a partial cutaway perspective view of a fiber optic connector showing the connector members mated and a single pair of signal connected fiber optic cables therein.

Referring now to the FIGS. 1–3 of the drawings in detail, there is illustrated a fiber optic connector assembly generally designated 10 comprising a plug connector member 12 mated to a receptacle connector member 14. The plug connector member 12 comprises a shell 13 containing a support member 16 which supports a plurality of fiber optic cables 18, only one being illustrated for purposes of clarity. It is noted that the support member 16 contains four axially extending passages 20 therethrough for holding fiber optic cables. It will be appreciated that any number of cables may be mounted in the connector member 12.

The mating receptacle connector member 14 also includes a shell 22 containing a support member 24 for fiber optic cables 26 equal in number to the cables 18 in plug connector member 12 and axially aligned therewith. The shell 22 has a mounting flange 27 thereon for mounting the connector 10 to a suitable panel or the like. The plug connector member 12 carries a rotatable coupling nut 28 having an arcuate slot 30 therein which cooperates with a pin 32 on the shell 22 to provide a bayonet connection between the two connector members, as well known in the electrical connector field, which allows the two connector members to be mated upon rotation of the coupling nut 28.

The support members 16 and 24 in the connector shells may be single pieces or multiple piece arrangements, as illustrated in FIG. 1.

The fiber optic cables 18 and 26 are identical and therefore only one of such cables 18 will be described, it being understood that the description thereof is applicable to the other cable 26. The various components of the cables will be designated by the same reference numerals. The cable 18 comprises a fiber optic bundle 34 with a jacket 36 surrounding the bundle. A termination pin 38 terminates the end of the bundle 34. Preferably, the pin is a hollow body having at least one axially extending slot 40 therein which extends from the forward end 42 of the body a predetermined distance toward the rear end thereof. Preferably, a pair of slots are provided, as best seen in FIG. 3. This arrangement provides a "split tine" or "spring tine" device for firmly gripping and compressing the individual glass fibers in the fiber bundle 34 in the vicinity of the point of interface abutment between the cables 18 and 26. An epoxy cement adheres the fibers together within the pin and fills any voids between the fibers at the end of the bundle 34.

A collar 44 is slidable on the pin 38 behind an annular groove 46 in the pin. A spring retention element 48 is mounted in the support member 16 surrounding the collar 44. The retention element has a pair of forwardly and inwardly extending spring fingers 50 engaging a rearwardly facing shoulder 52 on the collar 44 limiting rearward movement of the termination pin 38 in the support member 16. The pin is also formed with a forwardly facing tapered shoulder 54 which engages a rearwardly facing surface 56 on the support member 16 to limit forward movement of the termination pin in the connector. A resilient annular ring 58 lies within the groove 46. The mounting arrangement for the termination pin on the cable 26 may be identical to that employed in the support member 16 for the termination pin on cable 18.

When the connector members 12 and 14 are mated together, the ends of the termination pins 38 for the two fiber optic cables 16 and 26 are adjacent to each other. In order to assure that axial alignment is achieved between the opposed termination pins, an elastomeric sleeve 60 is provided in a recess 62 in the support member 16. The sleeve surrounds the abutting ends of the pins 38. The length of the sleeve 60 is greater than the distance between the front face 64 of the support 16 and the bottom 66 of recess 62 so that when the connector members are mated the support member 16 will apply compressive force to the end of the sleeve 60 causing it to contract radially inwardly, tightly fitting around the ends of the pins 38 and effecting a very accurate axial alignment therebetween.

The specific structure described herein for the termination pin 38, the mounting arrangement therefor in the support 16, and the axial alignment sleeve 60 are given by way of example only and constitute no part of the present invention. As will be seen from the following description, the advantages of the present invention will be achieved in any fiber optic connector wherein fiber bundles are axially aligned in abutting relationship. In accordance with the invention, a transparent protective sleeve 70 is provided over the forward ends of the aligned fiber bundles so that the faces of the bundles will be spaced apart and will not be subject to abrasion as normally occurs when the bundles are mated in direct abutting relationship. Preferably, the forward end of the fiber bundle 34 and the end surface 42 of the pin 38 are polished to provide a coplanar flat end surface 72. It is not necessary, however, that the end surface be highly polished as is normally the case when bundles are directly abutted with each other.

The transparent sleeve 70 is formed on the pin 38 by dipping the pin in a suitable liquid compound to form a thin liquid film thereon and then allowing the film to cure to form a thin, smooth transparent coating. The coating should have an index of refraction matching that of the fibers in the bundle 34. Preferably a clear silicone rubber is utilized to form the sleeve although other materials could be used if they have a matching index. A suitable compound is a clear two-part silicone rubber known in the trade as a RTV compound. It will be appreciated that the transparent sleeve or coating formed in this manner will have a closed end 74 extending over the end surface 72, providing an optical window for the fiber bundle 34. The coating will be bonded to the ends of the fibers and thus will fill any irregularities in the fiber ends. In addition, the coating will adhere to the epoxy cement between the fibers in the bundle and will fill any voids that might exist at the end of the bundle. Thus, the smooth coating will in effect provide an optically polished end for the fiber bundle, thus not requiring the bundle to be highly polished.

The sleeve 70 also provides a protective spacer which assures that the fiber bundle face will not abut against the opposed fiber bundle face at the end of the cable 26 when the cables 18 and 26 are mated in abutting relationship as illustrated in FIG. 2 upon interengagement of the connector members 12 and 14. It will be appreciated that as a practical matter only one of the fiber optic cables of the aligned pair of cables 18, 26 need be provided with a protective sleeve since one will assure spacing between the end faces of the fiber bundles in the cables. Nevertheless, it is preferred that all the cables in the connector be provided with a protective sleeve 70.

It is desirable that the thickness of the closed end 74 of the coating or sleeve 70 be as small as possible. Typically, the thickness of the sleeve is less than the thickness of the wall of the end of termination pin 38. To maintain optical power losses below about 0.2 dB due to the spacing between the ends of the fiber bundles, it is preferred that the thickness of the sleeve be no greater than about 0.002 inch, which will result in a 0.004 inch gap between the end faces of the bundles. While the gap between the bundles does result in a loss in optical transmission through the connector, this loss is substantially less than that which normally occurs due to the scratching of the end surfaces of the bundles, which may amount to 2 dB or more. The effect of having the protective sleeve to reduce optical losses becomes more significant when the amount of in-field use of the connector increases where the fiber bundles would otherwise be subjected to greater scratching particularly when grit is present, resulting in excessive light diffusion.

Reference is now made to FIG. 4 of the drawings which shows a modification of the forward end of the fiber optic cable of the present invention. This cable differs from that already described in that the end of the fiber bundle 34 extends beyond the end of termination pin 38'. A relatively hard, transparent sleeve 70' molded of matched index material is pressed over the end of the bundle. The sleeve 70' includes an outwardly extending flange 76' which is positioned behind a shoulder 78' on the pin to retain the sleeve over the bundle. A suitable material for the sleeve 70' is General Electric's Lexan polycarbonate. The closed end 74' of the sleeve 70' is flat and abuts against the planar end surface 72' of the fiber bundle. The molded sleeve 70' functions in the same manner as the coating 70 described previously herein.

While the invention has been described in connection with a fiber optic bundle containing a plurality of fibers, it will be appreciated that the protective sleeve could be provided on a single fiber, if desired.

The present invention not only assures that light transmission losses will be minimized when the connector of the present invention is used in typical field environments, where abrasion of the faces of the fiber bundles would otherwise occur due to dust or grit, the invention also provides protection for the fiber bundle ends when the cables are being shipped or handled during assembly.

What is claimed is:

1. A fiber optic cable for use in a fiber optic connector comprising:
   a fiber optic bundle including a plurality of light transmitting fibers terminating in a planar end surface;
   a transparent sleeve surrounding an end of said bundle;
   one end of said sleeve being closed and overlying said planar end surface of said bundle providing an optical window for said bundle; and
   said sleeve having an index of refraction substantially matching that of said fibers.

2. A fiber optic cable as set forth in claim 1 wherein: said sleeve comprises a coating of relatively pliable material.

3. A fiber optic cable as set forth in claim 2 wherein: said coating is formed of silicone rubber.

4. A fiber optic cable as set forth in claim 1 wherein: said sleeve is a relatively hard molded piece pressed over said bundle end.

5. A fiber optic cable as set forth in claim 4 wherein: the inside of said end of said sleeve is flat.

6. A fiber optic cable as set forth in claim 2 wherein: an epoxy cement fills any voids between said fibers in said bundle at said end of said bundle; and
   said end of said sleeve is bonded to said fibers at said planar end surface and also is integral with said cement whereby said end of said bundle is essentially free of any voids.

7. A fiber optic cable as set forth in claim 1 wherein:
   a hollow contact body surrounds said bundle end, said body having one end coplanar with said bundle end surface; and
   said sleeve comprises a coating of relatively pliable material on said contact body and said bundle end surface.

8. A fiber optic cable for use in a fiber optic connector comprising:
   an optical fiber teminating in a planar end surface;
   a transparent sleeve surrounding an end of said bundle;
   one end of said sleeve being closed and overlying said planar end surface of said fiber providing an optical window therefor; and
   said sleeve having an index of refraction substantially matching that of said fiber.

9. A fiber optic cable as set forth in claim 8 wherein: said sleeve comprises a coating of relatively pliable material.

10. A fiber optic connector for joining the ends of a pair of fiber optic bundles comprising:
    first and second fiber optic cables each containing a fiber optic bundle including a plurality of light transmitting fibers terminating in a planar end surface, said cable bundles having facing ends;
    first and second mating connector members containing said first and second cables, respectively;
    each said cable including a transparent sleeve surrounding said end of its respective bundle;
    said sleeve of each said cable having a closed end overlying said planar end surface of its respective bundle providing an optical window therefor;
    said sleeves each having an index of refraction substantially matching that of its respective fibers; and
    means in said connector members positioning said cables in axial alignment and causing said ends of said sleeves to abut each other when said connector members are mated whereby said planar end surfaces of said bundles are axially spaced apart.

* * * * *

UNITED STATES PATENT AND TRADEMARK OFFICE
CERTIFICATE OF CORRECTION

PATENT NO. : 3,984,174
DATED : October 5, 1976
INVENTOR(S) : Eleanor Anderson Landgreen It is certified that error appears in the above-identified patent and that said Letters Patent are hereby corrected as shown below:

Column 5, line 51, --integral-- should be inserted after "transparent";

Column 6, line 2, --continuous-- should be inserted after "a";

Column 6, line 28, --integral-- should be inserted after "transparent";

Column 6, lines 28 and 29, "bundle" should read --fiber--;

Column 6, line 36, --continuous-- should be inserted after "a"; and

Column 6, line 46, --integral-- should be inserted after "transparent".

Signed and Sealed this

Twenty-seventh Day of December 1977

[SEAL]

Attest:

RUTH C. MASON
Attesting Officer

LUTRELLE F. PARKER
Acting Commissioner of Patents and Trademarks